(12) United States Patent
Ikai et al.

(10) Patent No.: US 8,593,916 B2
(45) Date of Patent: Nov. 26, 2013

(54) THERMALLY-ASSISTED MAGNETIC RECORDING HEAD HAVING HEAT CONDUCTING UNIT AND HEAT ABSORBING UNIT AND MAGNETIC RECORDING AND REPRODUCING DEVICE HAVING THE SAME

(75) Inventors: Toshiyuki Ikai, Tokyo (JP); Hiroshi Isokawa, Kanagawa (JP); Masaya Ohtake, Tokyo (JP); Tomoko Taguchi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/419,397

(22) Filed: Mar. 13, 2012

(65) Prior Publication Data

US 2013/0176837 A1     Jul. 11, 2013

(30) Foreign Application Priority Data

Jan. 5, 2012   (JP) .................................. 2012-000450

(51) Int. Cl.
 *G11B 11/00*     (2006.01)
(52) U.S. Cl.
 USPC ..................................... 369/13.33; 369/13.13
(58) Field of Classification Search
 USPC .......... 369/13.02, 13.13, 13.32, 13.33, 13.17, 369/112.09, 112.14, 112.21, 112.27, 300; 360/59; 385/129, 31, 88–94; 29/603.07–603.27; 250/201.3, 201.5
See application file for complete search history.

(56) References Cited

U.S. PATENT DOCUMENTS

| | | | |
|---|---|---|---|
| 2009/0225464 A1* | 9/2009 | Juang et al. | 369/13.33 |
| 2012/0075965 A1* | 3/2012 | Tanaka et al. | 369/13.33 |
| 2012/0113771 A1* | 5/2012 | Matsumoto | 369/13.33 |

FOREIGN PATENT DOCUMENTS

| | | |
|---|---|---|
| JP | 07-18001 | 4/1995 |
| JP | 2001-307302 | 11/2001 |
| JP | 2006-013286 | 1/2006 |
| JP | 2008-071464 | 3/2008 |
| JP | 2011-118973 | 6/2011 |

* cited by examiner

*Primary Examiner* — Tan X Dinh
(74) *Attorney, Agent, or Firm* — Patterson & Sheridan, LLP

(57) ABSTRACT

According to one embodiment, there is provided a magnetic recording head which records information on a magnetic recording medium, including an ABS surface, a near-field light generating unit, a heat conducting unit, and a heat absorbing unit. The ABS surface is opposed to the magnetic recording medium. The near-field light generating unit is disposed on the ABS surface. The heat conducting unit is formed by a heat conductor disposed in contact with the near-field light generating unit. The heat absorbing unit is disposed in contact with the heat conducting unit adjacently to the near-field light generating unit in a direction along the ABS surface.

14 Claims, 8 Drawing Sheets

THERMALLY-ASSISTED MAGNETIC RECORDING HEAD HAVING HEAT CONDUCTING UNIT AND HEAT ABSORBING UNIT AND MAGNETIC RECORDING AND REPRODUCING DEVICE HAVING THE SAME

CROSS-REFERENCE TO RELATED APPLICATIONS

This application is based upon and claims the benefit of priority from Japanese Patent Application No. 2012-000450, filed on Jan. 5, 2012; the entire contents of which are incorporated herein by reference.

FIELD

Embodiments described herein relate generally to a magnetic recording head, and a magnetic recording and reproducing device.

BACKGROUND

In recent years, as the technique capable of carrying out high density magnetic recording in a 1 Tbit/inch$^2$ class, attention is paid to a thermally assisted magnetic recording method. The thermally assisted magnetic recording method is a technique for carrying out magnetic recording over a magnetic recording medium having a high holding power which is resistant to a thermal fluctuation. The thermally assisted magnetic recording method has a method of converting a laser beam into a near-field light by a near-field light generating unit and irradiating the near-field light thus obtained by the conversion on a part of a surface of a magnetic recording medium to locally raise a temperature of the magnetic recording medium, thereby applying a magnetic field to a portion in which the temperature is raised, thereby recording information magnetically. At this time, efficiency for converting a laser beam into a near-field light is low. For this reason, most of energy of the laser beam is converted into heat. Therefore, it is desired that the heat of the near-field light generating unit should be radiated efficiently.

DETAILED DESCRIPTION

In general, according to one embodiment, there is provided a magnetic recording head which records information on a magnetic recording medium, including an ABS surface, a near-field light generating unit, a heat conducting unit, and a heat absorbing unit. The ABS surface is opposed to the magnetic recording medium. The near-field light generating unit is disposed on the ABS surface. The heat conducting unit is formed by a heat conductor disposed in contact with the near-field light generating unit. The heat absorbing unit is disposed in contact with the heat conducting unit adjacently to the near-field light generating unit in a direction along the ABS surface.

Exemplary embodiments of a magnetic recording head, and a magnetic recording and reproducing device will be explained below in detail with reference to the accompanying drawings. The present invention is not limited to the following embodiments.

(First Embodiment)

Figure 1:
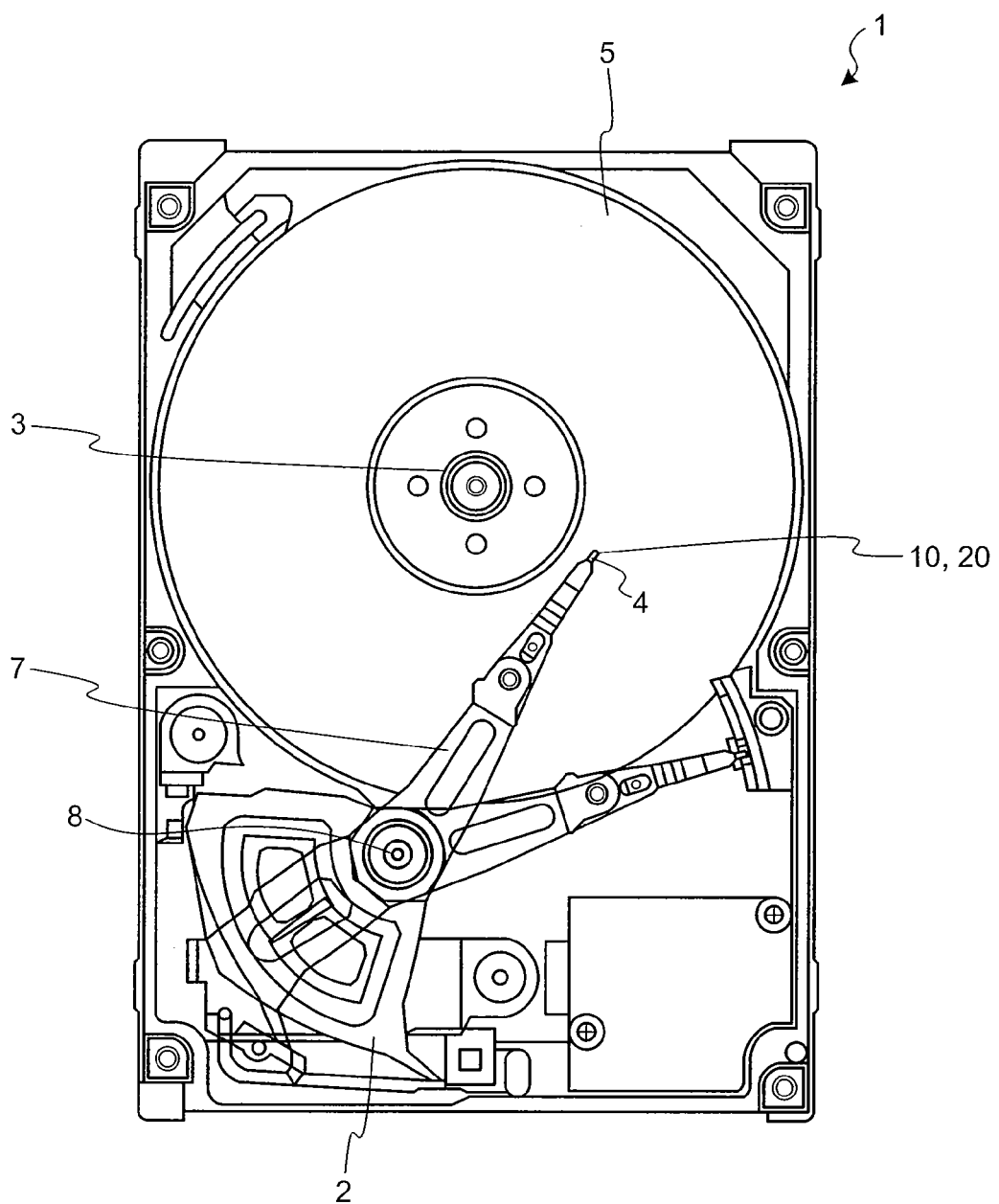
FIG. 1 is a view showing a structure of a magnetic recording and reproducing device according to a first embodiment.

First of all, the summary of a magnetic recording and reproducing device 1 according to a first embodiment will be described. FIG. 1 is a view showing a structure of the magnetic recording and reproducing device 1 according to the first embodiment. In FIG. 1, a magnetic recording medium 5 is a disc-shaped recording medium for recording various information, and is rotated and driven by means of a spindle motor 3. The magnetic recording medium 5 includes a vertical recording layer having anisotropy in a vertical direction with respect to a surface.

The read/write of the magnetic recording medium 5 is carried out by means of a magnetic recording head 10 and a magnetic reproducing head 20 which are provided through a head slider 4 at one of tips of an arm 7 to be a head support mechanism. The magnetic recording head 10 records information on the magnetic recording medium 5 while maintaining a slight lifting state from a surface of the magnetic recording medium 5 by lifting force generated by a rotation of the magnetic recording medium 5. The magnetic reproducing head 20 reads and reproduces the information recorded on the magnetic recording medium 5 while maintaining the slight lifting state from the surface of the magnetic recording medium 5 by lifting force generated through a rotation of the magnetic recording medium 5. By a driving operation of a voice coil motor 2 to be a head driving mechanism provided on the other end of an arm 7, moreover, the arm 7 is rotated over a circular arc around a shaft 8 so that the magnetic recording head 10 and the magnetic reproducing head 20 carry out a seek movement in a track crossing direction of the magnetic recording medium 5, thereby changing a track of a reading/writing target.

Next, a structure of the magnetic recording head 10 will be described with reference to FIGS. 2 to 4.

Figure 2:
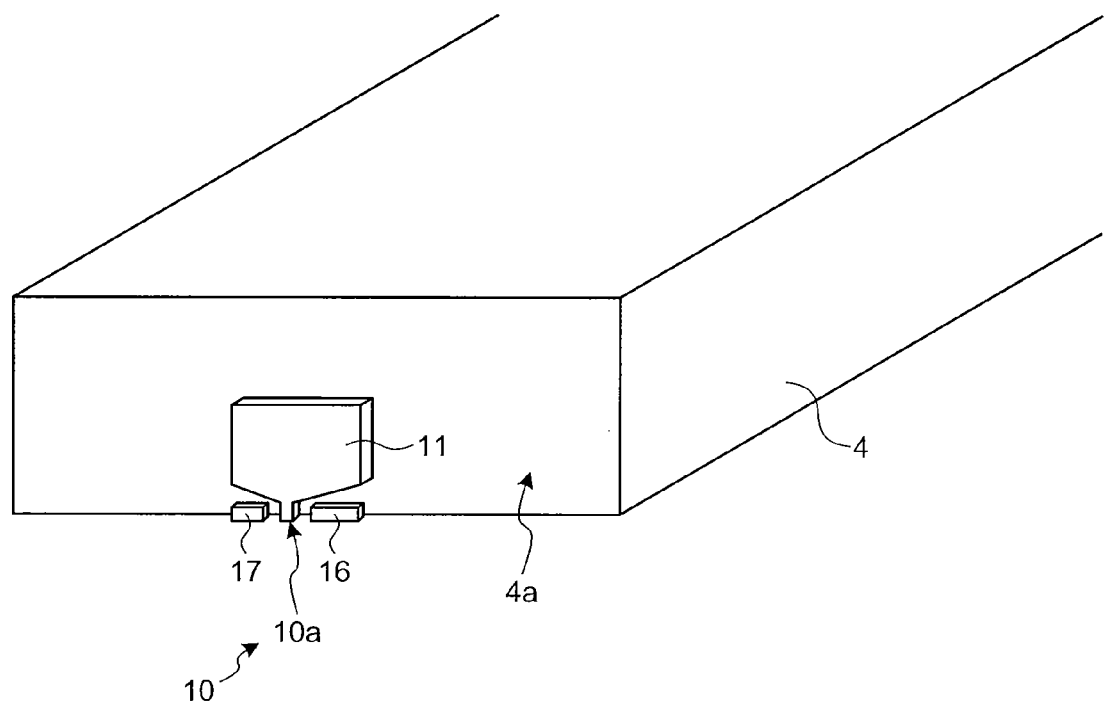
FIG. 2 is a view showing a structure of a magnetic recording head according to the first embodiment.

The magnetic recording head 10 is provided on a trailing end 4a side of the head slider 4 as shown in FIG. 2. At this time, the magnetic recording medium 5 is positioned below in FIG. 2 with respect to the magnetic recording head 10. In other words, in the magnetic recording head 10, a lower surface thereof in FIG. 2 serves as an ABS surface (an opposed surface) 10a. In FIG. 2, an inner side of the paper serves the trailing side and this side of the paper serves as a leading side.

Figure 3:
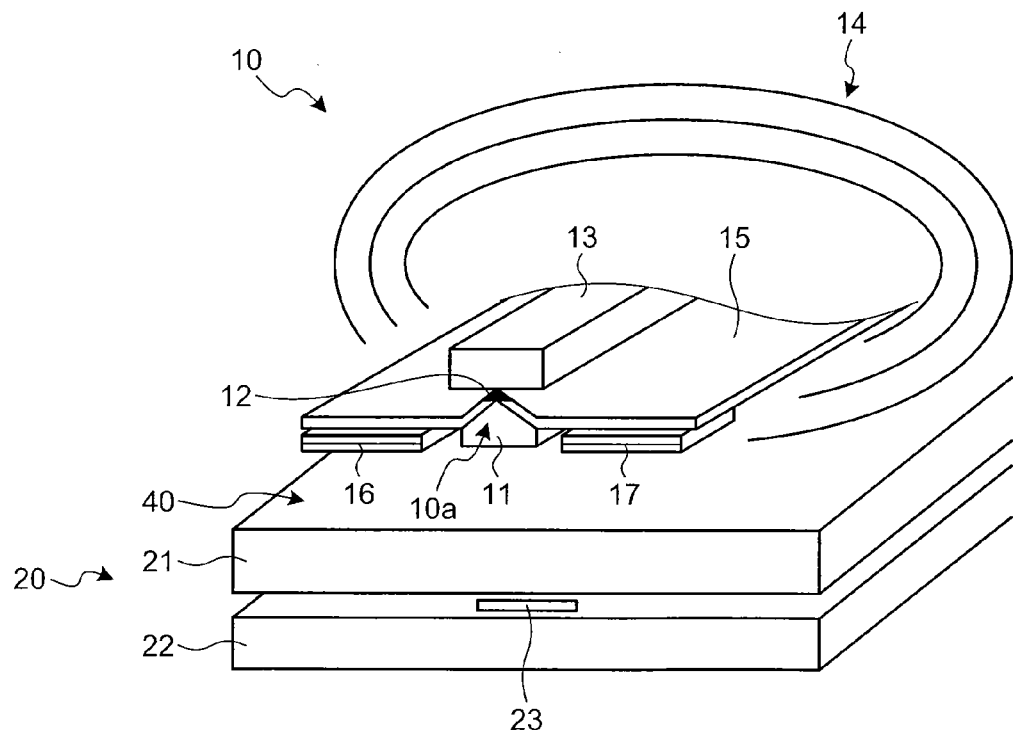
FIG. 3 is a view showing the structure of the magnetic recording head according to the first embodiment.

The magnetic recording head 10 is shown in FIG. 3 as seen from the ABS surface 10a side of the magnetic recording head 10. In other words, the magnetic recording head 10 has the ABS surface (Air Bearing Surface) 10a, a recording magnetic pole 11, a coil 14, a near-field light generating unit 12, a heat conducting unit 15, and a heat absorbing unit 40. In FIG. 3, an upper side of the paper serves as the trailing side and a lower side of the paper serves as the leading side.

The ABS surface (the opposite surface) 10a is opposed to the magnetic recording medium 5.

In the recording magnetic pole 11, an end face of the magnetic recording medium 5 side is provided in a plane position along the ABS surface 10a. The coil 14 is disposed to be wound around the recording magnetic pole 11. Consequently, the coil 14 and the recording magnetic pole 11 generate a magnetic field and record information on the magnetic recording medium 5. The recording magnetic pole 11 is formed by a soft magnetic material, for example. The coil 14 is formed by a conductor such as a metal (for example, Cu), for instance.

The near-field light generating unit 12 is disposed on the ABS surface 10a. A laser beam waveguide 13 is extended from a middle inner side of FIG. 3 in place of the ABS surface 10a to the vicinity of the ABS surface 10a and the vicinity of the near-field light generating unit 12. Consequently, the laser beam waveguide 13 receives a laser beam emitted from a light source (not shown) and guides the laser beam to the near-field light generating unit 12, and the near-field light generating unit 12 converts the guided laser beam into a near-field light and irradiates the near-field light thus obtained by the conversion on a portion in a surface of the magnetic recording medium 5 which is to be recorded by the recording magnetic pole 11. Consequently, a heat is applied to the portion in the surface of the magnetic recording medium 5 which is to be recorded by the recording magnetic pole 11. Therefore, a temperature of a vertical recording layer in that portion is raised to be equal to or higher than a Curie point so that an anisotropic magnetic field is reduced and information can be recorded by the recording magnetic pole 11 more easily.

At this time, efficiency for converting a laser beam in the near-field light generating unit 12 into a near-field light is approximately 10%, for example. Approximately 10% of energy of the laser beam is converted into the near-field light and the residual energy, that is, approximately 90% of the energy is converted into heat. For this reason, it is necessary to radiate the heat of the near-field light generating unit 12.

Therefore, there is provided a heat conducting unit 15 extended from a part between the near-field light generating unit 12 and the recording magnetic pole 11 to both sides in a direction along the ABS surface 10a. The heat conducting unit 15 is interposed between the near-field light generating unit 12 and the recording magnetic pole 11. Moreover, the heat conducting unit 15 has a first main surface 15a on which the near-field light generating unit 12 is disposed and a second main surface 15b on an opposite side to the first main surface 15a as shown in FIG. 4. In other words, since the first main surface 15a of the heat conducting unit 15 is provided in contact with the surface 12a on the recording magnetic pole 11 side of the near-field light generating unit 12, the heat of the near-field light generating unit 12 is radiated into an ambient atmosphere by the heat conducting unit 15. The heat conducting unit 15 is formed by a high heat conductor (for example, a metal such as Au or Cu), for instance.

Figure 4:
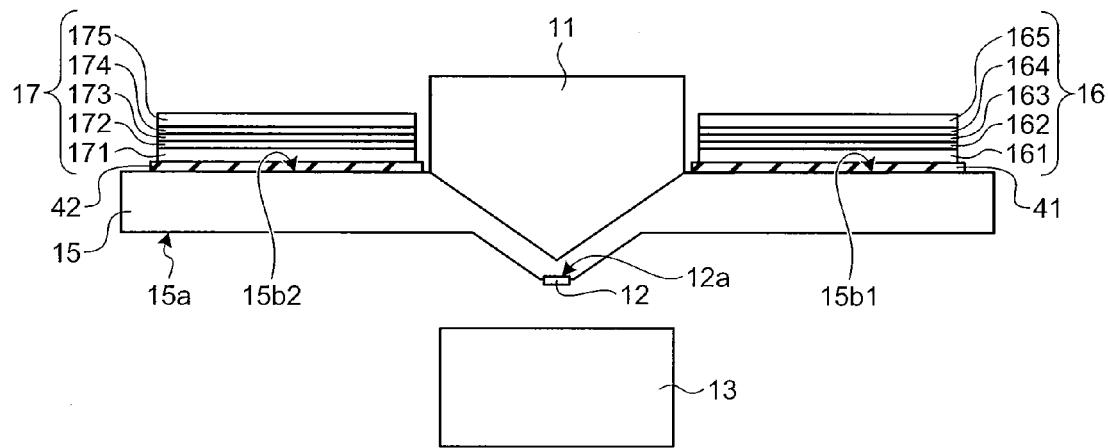
FIG. 4 is a view showing the structure of the magnetic recording head according to the first embodiment.

In FIG. 4, the lower side of the paper serves as a trailing side and the upper side of the paper serves as a leading side. In other words, the magnetic reproducing head 20 is provided on the leading side of the recording magnetic pole 11. The magnetic reproducing head 20 has a reproducing element 23, a shield 21, and a shield 22. The reproducing element 23 has a magnetic resistance effect and reads and reproduces the information recorded on the magnetic recording medium 5 as a reproducing signal by the magnetic resistance effect. The shields 21 and 22 are disposed to interpose the reproducing element 23 from both of front and rear sides in a running direction of the magnetic reproducing head 20.

Moreover, a heat absorbing unit 40 is provided on the second main surface 15b side (the leading side) of the heat conducting unit 15. The heat absorbing unit 40 absorbs the heat of the heat conducting unit 15 and radiates the heat into the ambient atmosphere. More specifically, the heat absorbing unit 40 has a first heat absorbing element 16, a second heat absorbing element 17, a first insulating layer 41 and a second insulating layer 42.

The first heat absorbing element 16 and the second heat absorbing element 17 are disposed on both track sides of the recording magnetic pole 11 and in opposed positions to the heat conducting unit 15. The first insulating layer 41 is interposed between the first heat absorbing element 16 and the heat conducting unit 15. The second insulating layer 41 is interposed between the second heat absorbing element 17 and the heat conducting unit 15.

In other words, the first heat absorbing unit 16 is disposed in an adjacent position to the near-field light generating unit 12 in the direction along the ABS surface 10a. The first heat absorbing unit 16 is disposed on an opposite side to the second heat absorbing element 17 with respect to the near-field light generating unit 12 in the direction along the ABS surface 10a. The first heat absorbing element 16 is opposed to the second main surface 15b of the heat conducting unit 15. An end face on the magnetic recording medium 5 side of the first heat absorbing element 16 is disposed in a plane position along the ABS surface 10a (see FIG. 3). Consequently, a distance between the first heat absorbing element 16 and the near-field light generating unit 12 can be shortened easily.

Moreover, the first insulating layer 41 is interposed between a first region 15b1 which is adjacent to the near-field light generating unit 12 in the direction along the ABS surface 10a over the second main surface 15b and the first heat absorbing element 16. The first region 15b1 is positioned on an opposite side to a second region 15b2 with respect to the near-field light generating unit 12. Consequently, the heat conducting unit 15 and the first heat absorbing element 16 can be thermally connected to each other, and at the same time, can be electrically insulated from each other. Therefore, the first heat absorbing element 16 can easily absorb the heat of the near-field light generating unit 12 via the heat conducting unit 15 and the first insulating layer 41. The first insulating layer 41 has an electrical insulating property, and furthermore, is formed by a material having high heat conductivity (for example, alumina, aluminum nitride or the like).

In addition, the second heat absorbing element 17 is disposed in an adjacent position to the near-field light generating unit 12 in the direction along the ABS surface 10a. The second heat absorbing element 17 is disposed on an opposite side to the first heat absorbing element 16 with respect to the near-field light generating unit 12 in the direction along the ABS surface 10a. The second heat absorbing element 17 is opposed to the second main surface 15b of the heat conducting unit 15. An end face on the magnetic recording medium 5 side of the second heat absorbing element 17 is disposed in a plane position along the ABS surface 10a (see FIG. 3). Consequently, it is possible to easily shorten a distance between the second heat absorbing element 17 and the near-field light generating unit 12.

Moreover, the second insulating layer 42 is interposed between the second region 15b2 which is adjacent to the near-field light generating unit 12 in the direction along the ABS surface 10a over the second main surface 15b and the first heat absorbing element 16. The second region 15b2 is positioned on an opposite side to the first region 15b1 with respect to the near-field light generating unit 12. Consequently, it is possible to electrically insulate the heat conducting unit 15 from the second heat absorbing element 17 while thermally connecting them. Therefore, the second heat absorbing element 17 can easily absorb the heat of the near-field light generating unit 12 via the heat conducting unit 15 and the second insulating layer 42. The second insulating layer 42 has an electrical insulating property, and furthermore, is formed by a material having high heat conductivity (for example, alumina, aluminum nitride or the like).

Next, structures of the first heat absorbing element 16 and the second heat absorbing element 17 in the heat absorbing unit 40 will be described with reference to FIGS. 4 and 5. Although FIG. 5 is the same as FIG. 4 in that the lower side of the paper serves as the trailing side and the upper side of the paper serves as the leading side, left and right positions are opposite to those in FIG. 4.

In the first heat absorbing element 16, as schematically shown in FIG. 4, a first heat absorbing layer 161, a first electrode layer 162, a first semiconductor layer 163, a first conductive layer 164 and a first radiating layer 165 are stacked in sequence from the heat conducting unit 15 side (the first insulating layer 41 side). The first heat absorbing element 16 is a Peltier element for absorbing heat by the Peltier effect, for example.

Figure 5:
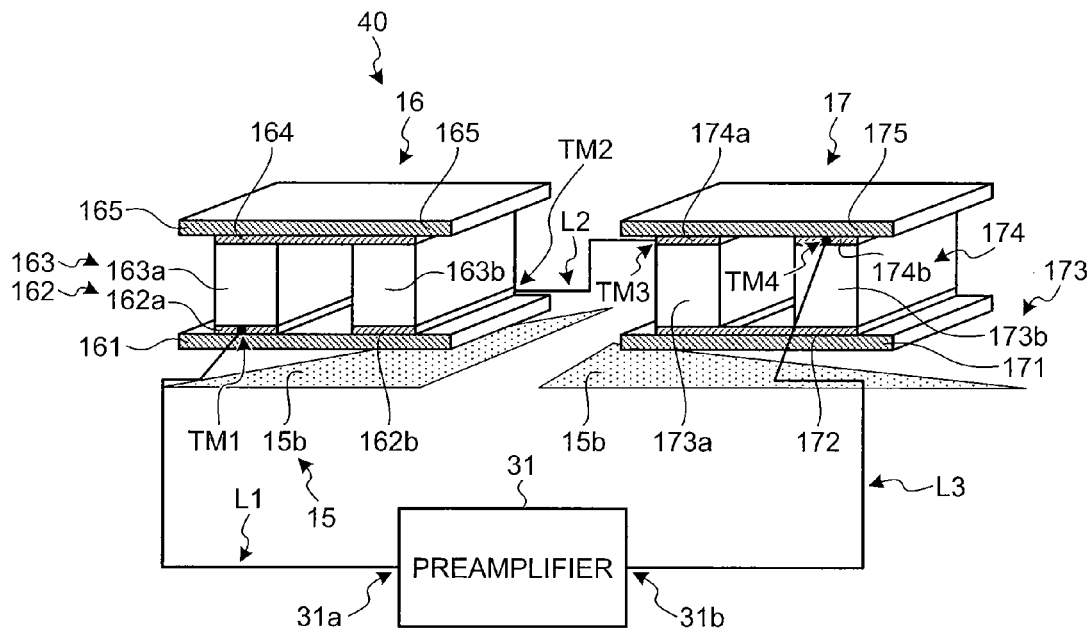
FIG. 5 is a view showing a structure of a heat absorbing unit according to the first embodiment.

More specifically, the first heat absorbing layer 161 is a plate-shaped member disposed opposite to the heat conducting unit 15, for example, as shown in detail in FIG. 5. The first heat absorbing layer 161 is formed by a high heat conductor (Au, Cu or the like), for example.

The first electrode layer 162 has two electrode units 162a and 162b which are isolated from each other in the first electrode layer 162. The two electrode units 162a and 162b are thermally and electrically connected to the first heat absorbing layer 161, respectively. The two electrode units 162a and 162b are formed by a conductor such as a metal (for example, Cu), respectively.

The first semiconductor layer 163 has an N-type semiconductor 163a and a P-type semiconductor 163b which are isolated from each other in the first semiconductor layer 163. The N-type semiconductor 163a is thermally and electrically connected to the electrode unit 162a and the P-type semiconductor 163b is thermally and electrically connected to the electrode unit 162b. The N-type semiconductor 163a is formed by a semiconductor containing an N-type impurity (for example, phosphorus, arsenic or the like). The P-type semiconductor 163b is formed by a semiconductor containing a P-type impurity (for example, boron, aluminum or the like).

The first conductive layer 164 is thermally and electrically connected to the N-type semiconductor 163a at an opposite side to the electrode unit 162a, and is thermally and electrically connected to the P-type semiconductor 163b at an opposite side to the electrode unit 162b. The first conductive layer 164 is formed by a conductor such as a metal (for example, Cu), for instance.

The first radiating layer 165 is thermally and electrically connected to the first conductive layer 164 at an opposite side to the N-type semiconductor 163a and the P-type semiconductor 163b. The first radiating layer 165 is formed by a high heat conductor (Au, Cu or the like), for instance.

For example, in the first heat absorbing element 16, the electrode unit 162a, the N-type semiconductor 163a, the first conductive layer 164, the P-type semiconductor 163b and the electrode unit 162b form a structure taking an almost II shape seen on a section. The structure taking almost the II shape is interposed between the first heat absorbing layer 161 and the first radiating layer 165 from the trailing side and the leading side, respectively.

In the second heat absorbing element 17, as schematically shown in FIG. 4, a second heat absorbing layer 171, a second electrode layer 172, a second semiconductor layer 173, a second conductive layer 174 and a second radiating layer 175 are stacked in sequence from the heat conducting unit 15 side (the second insulating layer 42 side). The second heat absorbing element 17 is a Peltier element for absorbing heat by the Peltier effect, for example.

More specifically, the second heat absorbing layer 171 is a plate-shaped member disposed opposite to the heat conducting unit 15, for example, as shown in detail in FIG. 5. The second heat absorbing layer 171 is formed by a high heat conductor (Au, Cu or the like), for example.

The second electrode layer 172 is thermally and electrically connected to the second heat absorbing layer 171. The second electrode layer 172 is formed by a conductor such as a metal (for example, Cu), for instance.

The second semiconductor layer 173 has an N-type semiconductor 173a and a P-type semiconductor 173b which are isolated from each other in the second semiconductor layer 173. The N-type semiconductor 173a is thermally and electrically connected to the second electrode layer 172 and the P-type semiconductor 173b is thermally and electrically connected to the second electrode layer 172. The N-type semiconductor 173a is formed by a semiconductor containing an N-type impurity (for example, phosphorus, arsenic or the like). The P-type semiconductor 173b is formed by a semiconductor containing a P-type impurity (for example, boron, aluminum or the like).

The second conductive layer 174 has two conductive units 174a and 174b which are isolated from each other in the second conductive layer 174. The conductive unit 174a is thermally and electrically connected to the N-type semiconductor 173a at an opposite side to the second electrode layer 172. The conductive unit 174b is thermally and electrically connected to the P-type semiconductor 173b at an opposite side to the second electrode layer 172. Two conductive units 174a and 174b are formed by a conductor such as a metal (for example, Cu) respectively, for instance.

The second radiating layer 175 is thermally and electrically connected to the conductive unit 174a at an opposite side to the N-type semiconductor 173a and is thermally and electrically connected to the conductive unit 174b at an opposite side to the P-type semiconductor 173b. The second radiating layer 175 is formed by a high heat conductor (Au, Cu or the like), for instance.

For example, in the second heat absorbing element 17, the conductive unit 174a, the N-type semiconductor 173a, the second electrode layer 172, the P-type semiconductor 173b and the conductive unit 174b form a structure taking an almost inverted II shape seen on a section. The structure taking almost the inverted II shape is interposed between the second heat absorbing layer 171 and the second radiating layer 175 from the trailing side and the leading side, respectively.

With the structure shown in FIG. 5, a terminal 31a on a current supplying side of a preamplifier 31 is electrically connected to a terminal TM1 of the electrode unit 162a through a line L1. A terminal TM2 of the electrode unit 162b is electrically connected to a terminal TM3 of the conductive unit 174a through a line L2. A terminal TM4 of the conductive unit 174b is electrically connected to a terminal 31b on a current feedback side through a line L3. Consequently, the structure taking almost the II shape in the first heat absorbing element 16 and the structure taking almost the inverted II shape in the second heat absorbing element 17 function as a current path, respectively.

More specifically, the preamplifier 31 applies a voltage in such a manner that a current flows in order of the terminal 31a on the current supplying side of the preamplifier 31, the electrode unit 162a, the N-type semiconductor 163a, the first conductive layer 164, the P-type semiconductor 163b, the electrode unit 162b, the conductive unit 174a, the N-type semiconductor 173a, the second electrode layer 172, the P-type semiconductor 173b, the conductive unit 174b, and the terminal 31b on the current feedback side of the preamplifier 31. By thus causing the current to flow, a heat absorbing effect is produced under the first heat absorbing layer 161 and the second absorbing layer 171 which are connected to the electrode units 162a and 162b and the second electrode layer 172, respectively. Therefore, it is possible to lower the temperature of the heat conducting unit 15. Consequently, it is possible to reduce an amount of protrusion of the ABS surface 10a of the magnetic recording head 10 toward the magnetic recording medium 5 side.

In this case, the first heat absorbing element 16 and the second heat absorbing element 17 are disposed apart from each other at both sides in a direction of a track width with respect to the near-field light generating unit 12. Therefore, it is possible to reduce the amount of protrusion of the ABS surface 10a of the magnetic recording head 10 toward the magnetic recording medium 5 side without lowering a temperature of the near-field light which is generated from the near-field light generating unit 12.

Figure 6:
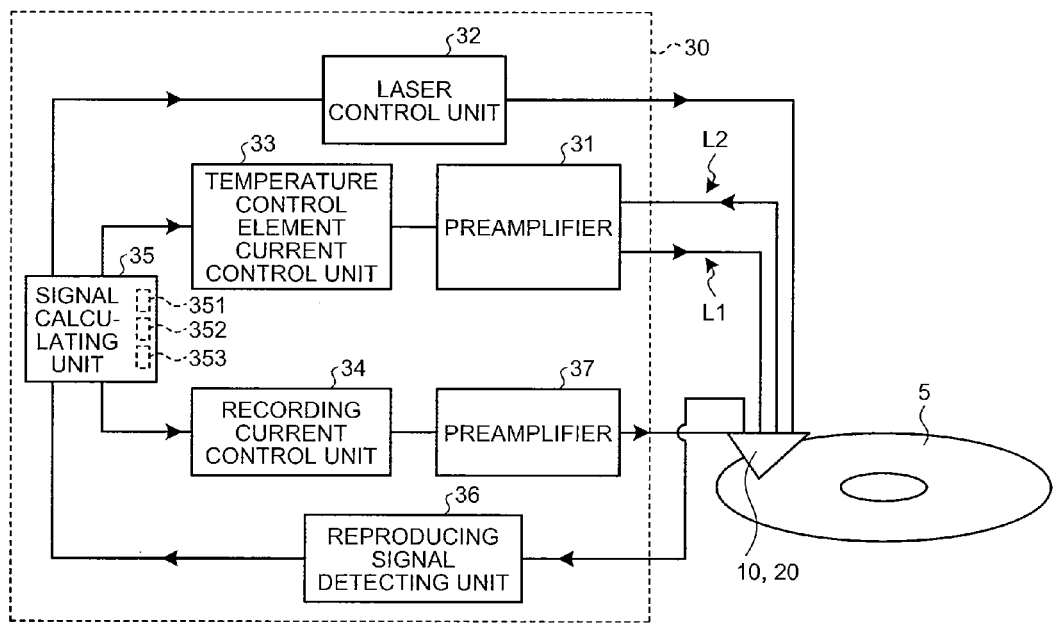
FIG. 6 is a diagram showing a structure of a control unit according to the first embodiment.

Next, a structure of a control unit 30 including the preamplifier 31 will be described with reference to FIG. 6.

The control unit 30 has a temperature control element current control unit 33, the preamplifier 31, a laser control unit 32, a recording current control unit 34, a reproducing signal detecting unit 36 and a signal calculating unit 35.

When information is to be recorded on the magnetic recording medium 5 by means of the magnetic recording head 10, the temperature control element current control unit 33 determines a current to flow to the first heat absorbing element 16 and the second heat absorbing element 17 by the preamplifier 31, and generates a control signal corresponding to the determined current and supplies the control signal to the preamplifier 31.

The preamplifier 31 receives the control signal from the temperature control element current control unit 33. The preamplifier 31 causes a current to flow to the first heat absorbing element 16 and the second heat absorbing element 17 through the lines L1 and L2 when the information is to be recorded on the magnetic recording medium 5 by means of the magnetic recording head 10 in accordance with the control signal.

When the information is to be recorded on the magnetic recording medium 5 by means of the magnetic recording head 10, the laser control unit 32 controls a light source (not shown) to regulate an intensity of a laser beam to be guided from the light source (not shown) to the near-field light generating unit 12 via the laser beam waveguide 13.

When the information is to be recorded on the magnetic recording medium 5 by means of the magnetic recording head 10, the recording current control unit 34 determines a recording current to flow to the coil 14, and generates a control signal corresponding to the determined current and supplies the control signal to the preamplifier 37.

The preamplifier 37 receives the control signal from the recording current control unit 34. When the information is to be recorded on the magnetic recording medium 5 by means of the magnetic recording head 10 in accordance with the control signal, the preamplifier 37 causes a current to flow to the coil 14.

When the information recorded on the magnetic recording medium 5 is to be reproduced by the magnetic reproducing head 20, the reproducing signal detecting unit 36 detects a reproducing signal sent from the reproducing element 23. The reproducing signal detecting unit 36 supplies the detected reproducing signal to the signal calculating unit 35.

The signal calculating unit 35 controls the temperature control element current control unit 33, the recording current control unit 34 and the laser control unit 32 based on the reproducing signal sent from the reproducing signal detecting unit 36. For example, the signal calculating unit 35 uses a reproducing signal such as a servo signal to predict the amount of protrusion of the ABS surface 10a of the magnetic recording head 10 toward the magnetic recording medium 5 side, thereby controlling a magnitude or timing of the current to be determined by the temperature control element current control unit 33, a magnitude or timing of the current to be determined by the recording current control unit 34, and an intensity of a laser beam to be regulated by the laser control unit 32 based on a result of the prediction.

For example, the signal calculating unit 35 may control to start a current to flow to the first heat absorbing element 16 and the second heat absorbing element 17 synchronously with a timing for starting a recording operation through the magnetic recording head 10. In other words, the signal calculating unit 35 may synchronize a timing for starting a current to flow to the coil 14 by the recording current control unit 34 with a timing for starting a current to flow to the first heat absorbing element 16 and the second heat absorbing element 17 by the temperature control element current control unit 33.

Alternatively, control may be carried out to start the current to flow to the first heat absorbing element 16 and the second heat absorbing element 17 before the timing for starting the recording operation through the magnetic recording head 10 by a predetermined time, for example. The predetermined time is previously determined experimentally in consideration of a lag time from the start of the current to flow to the first heat absorbing element 16 and the second heat absorbing element 17 to stabilization of the heat absorbing operation of the first heat absorbing element 16 and the second heat absorbing element 17. In other words, the signal calculating unit 35 may set the timing before the timing for starting the current to flow to the coil 14 through the recording current control unit 34 by the predetermined time as the timing for starting the current to flow to the first heat absorbing element 16 and the second heat absorbing element 17 through the temperature control element current control unit 33.

Moreover, it is possible to optimize and regulate an on-track performance and the amount of protrusion by executing a feedback for a reproducing signal.

For example, when the information recorded on the magnetic recording medium 5 is reproduced by the magnetic reproducing head 20, the signal calculating unit 35 uses the reproducing signal supplied from the reproducing signal detecting unit 36 to monitor a bit error rate of the reproduced information. For example, the signal calculating unit 35 has a saving unit 351, a comparing unit 352 and a calculating unit 353. Every time the saving unit 351 receives the reproducing signal from the reproducing signal detecting unit 36, it saves the reproducing signal as reproducing signal history information in relation to a timing for receiving the reproducing signal. The saving unit 351 saves the reproducing signals detected by the reproducing signal detecting unit 36 as reproducing signal history information, respectively. The comparing unit 352 compares the reproducing signals saved in the saving unit 351 with each other and supplies a result of the comparison to the calculating unit 353. For example, in the case in which the reproducing signals saved in the saving unit 351 include information to be reproduced and an error correcting code, the comparing unit 352 uses the error correcting code to carry out an error correction processing over the information (data) to be reproduced and supplies a result of the error correction processing as a result of the comparison to the calculating unit 353. The calculating unit 353 carries out a calculation depending on the result of the comparison obtained by the comparing unit 352. For example, when the result of the error correction processing obtained by the comparing unit 352 is received, the calculating unit 353 calculates a bit error rate depending on the result of the error correction processing (for example, the number of error corrections), and furthermore, calculates a variation in the bit error rate. The calculating unit 353 supplies a result of the calculation to the temperature control element current controlling unit 33. The temperature control element current control unit (determining unit) 33 determines a current to flow to the first heat absorbing element 16 and the second heat absorbing element 17 depending on the result of the calculation which is obtained by the calculating unit 353 (for example, a variation in the bit error rate calculated by the calculating unit 353). More specifically, the temperature control element current control unit 33 determines the current to flow to the first heat absorbing element 16 and the second heat absorbing element 17 depending on the calculated bit error rate and a fluctuation range. The temperature control element current control unit 33 supplies a control signal depending on a result of the determination to the preamplifier 31. The preamplifier (current supplying unit) 31 causes the current to flow to the first heat absorbing element 16 and the second heat absorbing element 17 in accordance with the result of the determination obtained by the temperature control element current control unit (determining unit) 33, that is, a control signal corresponding to the result of the determination.

Figure 7:
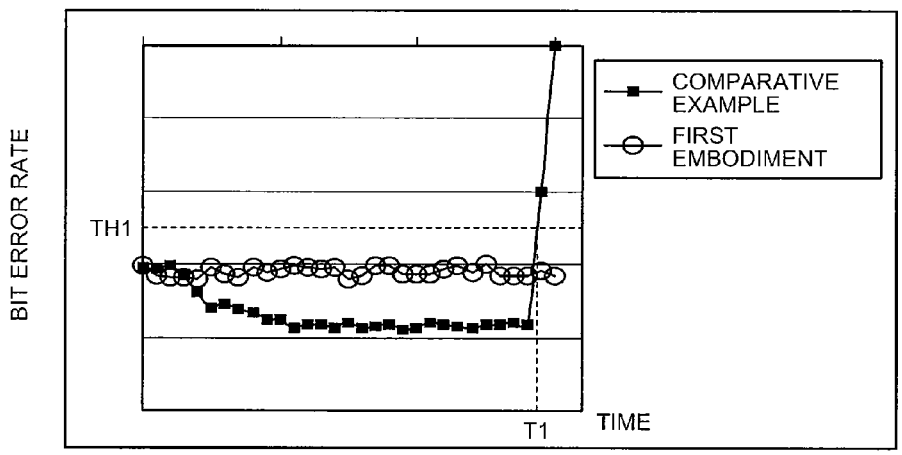
FIG. 7 is a chart showing an operation of the control unit according to the first embodiment.
Figure 7:

For example, referring to the bit error rate, there will be considered the case in which it is previously and experimentally obtained that the amount of protrusion of the ABS surface 10a toward the magnetic recording medium 5 side is maintained to be reduced if the bit error rate is smaller than a threshold TH1, and the amount of protrusion of the ABS surface 10a toward the magnetic recording medium 5 side tends to be increased if the bit error rate is equal to or greater than the threshold TH1 as shown in FIG. 7, and the threshold TH1 is preset to the temperature control element current control unit 33. For example, when the recording operation of the magnetic recording head 10 is carried out continuously for a time T1 or more shown in FIG. 7 and the information recorded on the magnetic recording medium 5 is then reproduced by the magnetic reproducing head 20, the signal calculating unit 35 uses the reproducing signal supplied from the reproducing signal detecting unit 36 to calculate the bit error rate of the reproduced information. Then, the temperature control element current control unit 33 decides whether the calculated bit error rate is equal to or greater than the threshold TH1.

For example, the temperature control element current control unit 33 assumes that the magnitude of the current to flow to the first heat absorbing element 16 and the second heat absorbing element 17 should be maintained to be a magnitude determined immediately before if the bit error rate is smaller than the threshold TH1 (it is assumed that a first condition is satisfied). Alternatively, if the bit error rate is equal to or greater than the threshold TH1, the temperature control element current control unit 33 assumes that the magnitude of the current to flow to the first heat absorbing element 16 and the second heat absorbing element 17 should be increased to be greater than the magnitude determined immediately before (it is assumed that a second condition is satisfied).

Alternatively, if the bit error rate is smaller than the threshold TH1, for example, the temperature control element current control unit 33 assumes that the magnitude of the current to flow to the first heat absorbing element 16 and the second heat absorbing element 17 should be decreased to be smaller than the magnitude determined by the temperature control element current control unit 33 immediately before (it is assumed that a third condition is satisfied). Alternatively, if the bit error rate is equal to or greater than the threshold TH1, the temperature control element current control unit 33 assumes that the magnitude of the current to flow to the first heat absorbing element 16 and the second heat absorbing element 17 should be increased to be greater than the magnitude determined immediately before (it is assumed that the second condition is satisfied).

Figure 8:
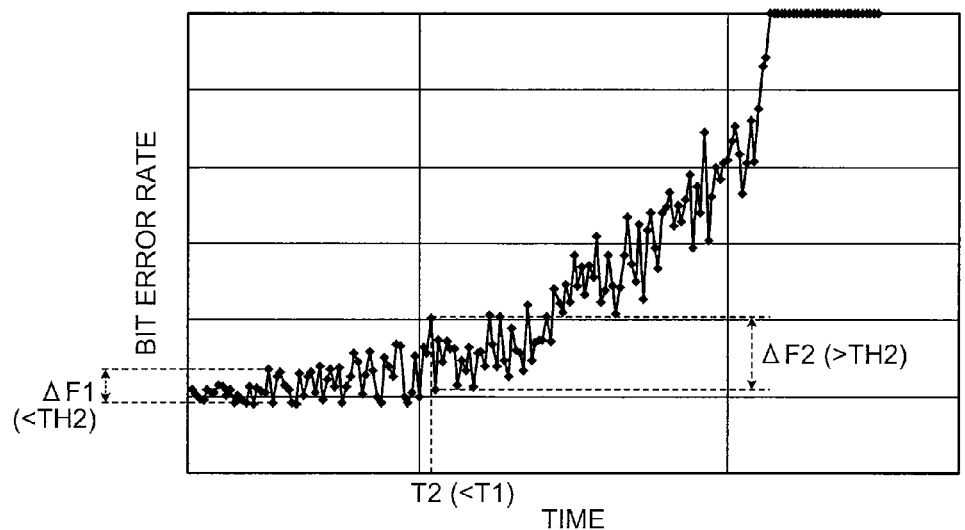
FIG. 8 is a chart showing the operation of the control unit according to the first embodiment.

For example, referring to the fluctuation range of the bit error rate, there will be considered the case in which it is previously and experimentally obtained that the amount of protrusion of the ABS surface 10a toward the magnetic recording medium 5 side is maintained to be reduced if the fluctuation range of the bit error rate (for example, ΔF1) is smaller than the threshold TH2, and the amount of protrusion of the ABS surface 10a toward the magnetic recording medium 5 side tends to be increased if the fluctuation range of the bit error rate is equal to or greater than the threshold TH2 as shown in FIG. 8, and the threshold TH2 is preset to the temperature control element current control unit 33. For example, when the recording operation of the magnetic recording head 10 is carried out continuously for the time T1 (>a time T2 shown in FIG. 8) or more shown in FIG. 7 and the information recorded on the magnetic recording medium 5 is then reproduced by the magnetic reproducing head 20, the signal calculating unit 35 uses the reproducing signal supplied from the reproducing signal detecting unit 36 to calculate the fluctuation range of the bit error rate of the reproduced information. Then, the temperature control element current control unit 33 decides whether the fluctuation range of the calculated bit error rate is equal to or greater than the threshold TH2.

For example, the temperature control element current control unit 33 assumes that the magnitude of the current to flow to the first heat absorbing element 16 and the second heat absorbing element 17 should be maintained to be a magnitude determined immediately before if the fluctuation range of the bit error rate is smaller than the threshold TH2 (it is assumed that a fourth condition is satisfied). Alternatively, if the fluctuation range of the bit error rate is equal to or greater than the threshold TH2, the temperature control element current control unit 33 assumes that the magnitude of the current to flow to the first heat absorbing element 16 and the second heat absorbing element 17 should be increased to be greater than the magnitude determined immediately before (it is assumed that a fifth condition is satisfied).

Alternatively, if the fluctuation range of the bit error rate is smaller than the threshold TH2, for example, the temperature control element current control unit 33 assumes that the magnitude of the current to flow to the first heat absorbing element 16 and the second heat absorbing element 17 should be decreased to be smaller than the magnitude determined immediately before (it is assumed that a sixth condition is satisfied). Alternatively, if the fluctuation range of the bit error rate is equal to or greater than the threshold TH2, the temperature control element current control unit 33 assumes that the magnitude of the current to flow to the first heat absorbing element 16 and the second heat absorbing element 17 should be increased to be greater than the magnitude determined immediately before (it is assumed that the fifth condition is satisfied).

Referring to both the bit error rate and the fluctuation range, for example, the temperature control element current control unit 33 increases the magnitude of the current to flow to the first heat absorbing element 16 and the second heat absorbing element 17 to be greater than the magnitude determined immediately before if both the second condition and the fifth condition are satisfied, and maintains the magnitude of the current to flow to the first heat absorbing element 16 and the second heat absorbing element 17 to be the magnitude determined immediately before or decreases the same magnitude to be smaller than the magnitude determined immediately before if at least one of the second condition and the fifth condition is not satisfied. Consequently, it is possible to enhance precision in an estimation in a state in which the amount of protrusion of the ABS surface 10a toward the magnetic recording medium 5 side tends to be increased. Thus, the magnitude of the current to flow to the first heat absorbing element 16 and the second heat absorbing element 17 can be regulated to have a proper value.

Figure 9:
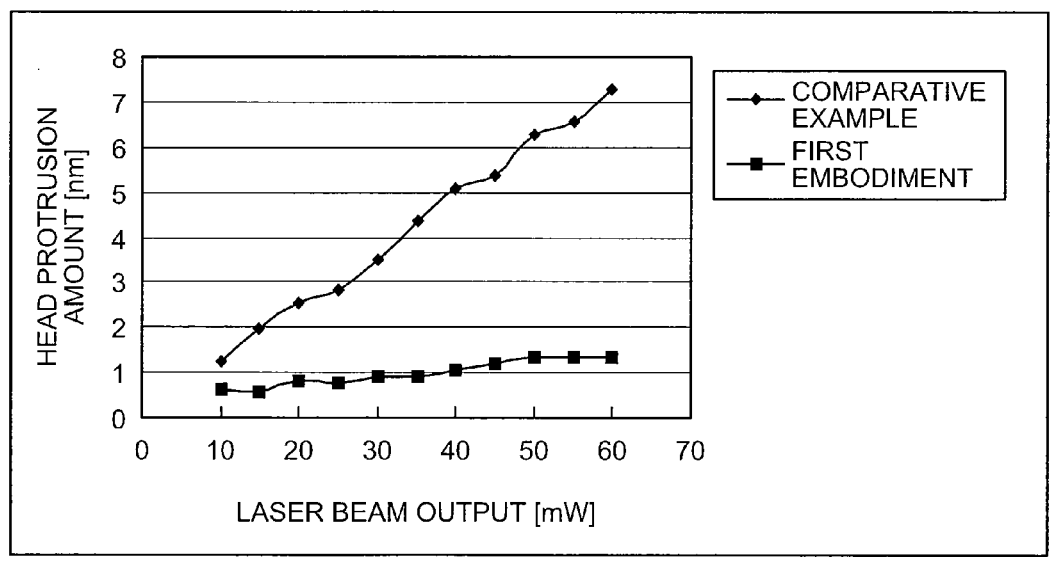
FIG. 9 is a chart for explaining an effect obtained according to the first embodiment.

There will be considered the case in which the magnetic recording head 10 does not have the heat absorbing unit 40. In this case, the heat conducting unit 15 radiates the heat of the near-field light generating unit 12 into an ambient atmosphere. However, there is a tendency that the heat which cannot be completely radiated by the heat conducting unit 15 stays in the vicinity of the near-field light generating unit 12 when the amount of the heat of the near-field light generating unit 12 is increased. For example, as shown in a comparative example in FIG. 9, the magnetic recording head 10 having no heat absorbing unit 40 has a tendency that the amount of protrusion of the ABS surface 10a is increased with an increase in an output of a laser beam. This is supposed to be caused by an expansion of the heat conducting unit 15 with a rise in a temperature of the heat conducting unit 15. At this time, with regard to a variation in a bit error rate (BER) after an ON operation of a write gate, the bit error rate is gradually improved after the ON operation of the write gate as shown in the comparative example of FIG. 7. However, there is a tendency that the bit error rate is rapidly deteriorated due to a continuous execution of the recording operation. This is supposed as follows. With an increase in the amount of protrusion of the ABS surface 10a, a distance between the magnetic recording head 10 and the magnetic recording medium 5 is shortened so that the bit error rate is temporarily improved slightly and the magnetic recording head 10 and the magnetic recording medium 5 are then damaged mutually by continuous running in an excessive amount of protrusion of the ABS surface 10a.

On the other hand, in the first embodiment, the magnetic recording head 10 has the heat absorbing unit 40. The heat absorbing unit 40 absorbs the heat of the heat conducting unit 15 and radiates the heat into the ambient atmosphere. More specifically, in the heat absorbing unit 40, the first heat absorbing element 16 is provided in an adjacent position to the near-field light generating unit 12 in the direction along the ABS surface 10a in order to absorb the heat of the heat conducting unit 15. The second heat absorbing element 17 is provided on an opposite side to the first heat absorbing element 16 with respect to the near-field light generating unit 12 in the direction along the ABS surface 10a in order to absorb the heat of the heat conducting unit 15. Since the first heat absorbing element 16 and the second heat absorbing element 17 are disposed apart from each other at both sides in the direction of the track width with respect to the near-field light generating unit 12, consequently, it is possible to reduce the amount of protrusion of the ABS surface 10a of the magnetic recording head 10 toward the magnetic recording medium 5 side without lowering the temperature of the near-field light generated from the near-field light generating unit 12. In other words, the first heat absorbing element 16 and the second heat absorbing element 17 which serve to absorb the heat can be disposed in the vicinity of the heat conducting unit 15 except for a tack center in which the near-field light generating unit 12 is provided. Therefore, it is possible to reduce the amount of protrusion of the ABS surface 10a of the head 10 toward the magnetic recording medium 5 side without deteriorating quality of a thermal assisted recording signal on a track. For example, as shown in the first embodiment of FIG. 9, the heat absorbing effect of the heat absorbing unit 40 is controlled so that the expansion of the ABS surface 10a can be suppressed in the magnetic recording head 10 having the heat absorbing unit 40. Even if the output of the laser beam is increased, therefore, the amount of protrusion of the ABS surface 10a can be reduced to be almost constant. At this time, with regard to the variation in the bit error rate (BER) after the ON operation of the write gate, the bit error rate can be stabilized to be almost constant after the ON operation of the write gate as shown in the first embodiment of FIG. 7. According to the first embodiment, thus, it is possible to reduce the amount of protrusion of the ABS surface 10a of the magnetic recording head 10 toward the magnetic recording medium 5 side. Therefore, it is possible to suppress the mutual damage of the magnetic recording head 10 and the magnetic recording medium 5, thereby enhancing a reliability of the magnetic recording and reproducing device 1.

In the first embodiment, moreover, the first heat absorbing element 16 and the second heat absorbing element 17 are provided in adjacent positions to both sides of the near-field light generating unit 12 in the direction along the ABS surface 10a. Consequently, it is possible to easily shorten the distance between the near-field light generating unit 12 and the first heat absorbing element 16 and second heat absorbing element 17 as seen in the direction along the ABS surface 10a. Therefore, it is possible to efficiently absorb the heat of the near-field light generating unit 12 via the heat conducting unit 15, thereby radiating the heat effectively.

In the first embodiment, furthermore, referring to the magnetic recording head 10 in the heat absorbing unit 40, the end face of the first heat absorbing element 16 on the magnetic recording medium 5 side is provided in the plane position along the ABS surface 10a and the end face of the second heat absorbing element 16 on the magnetic recording medium 5 side is provided in the plane position along the ABS surface 10a. Consequently, it is possible to more easily shorten the distance between the near-field light generating unit 12 and the first heat absorbing element 16 and second heat absorbing element 17 as seen in a perpendicular direction to the ABS surface 10a. Therefore, it is possible to absorb the heat of the near-field light generating unit 12 via the heat conducting unit 15 more efficiently. Thus, it is possible to radiate the heat further efficiently.

In the first embodiment, moreover, the first insulating layer 41 is interposed between the second main surface 15b of the heat conducting unit 15 and the first heat absorbing element 16. Consequently, it is possible to electrically insulate the heat conducting unit 15 from the first heat absorbing element 16 while thermally connecting them. Therefore, the first heat absorbing unit 16 can easily absorb the heat of the near-field light generating unit 12 via the heat conducting unit 15 and the first insulating layer 41. Similarly, the second insulating layer 44 is interposed between the second main surface 15b of the heat conducting unit 15 and the second heat absorbing element 17. Consequently, it is possible to electrically insulate the heat conducting unit 15 from the second heat absorbing element 17 while thermally connecting them. Therefore, the second heat absorbing unit 17 can easily absorb the heat of the near-field light generating unit 12 via the heat conducting unit 15 and the second insulating layer 42. In other words, it is possible to absorb the heat of the near-field light generating unit 12 while suppressing a leakage of the current flowing to the first heat absorbing element 16 and the second heat absorbing element 17 to the heat conducting unit 15 side. Therefore, it is possible to efficiently absorb the heat of the near-field light generating unit 12.

In the first embodiment, furthermore, when the information recorded on the magnetic recording medium 5 is reproduced by the magnetic reproducing head 20, the control unit 30 calculates the bit error rate of the reproduced information and determines the current to flow to the first heat absorbing element 16 and the second heat absorbing element 17 depending on the variation in the bit error rate which is calculated. When the information is to be recorded on the magnetic recording medium 5 by means of the magnetic recording head 10, then, the control unit 30 causes the determined current to flow to the first heat absorbing element 16 and the second heat absorbing element 17. Consequently, it is possible to estimate the state of the amount of protrusion of the ABS surface 10a toward the magnetic recording medium 5 side. Thus, the magnitude of the current to flow to the first heat absorbing element 16 and the second heat absorbing element 17 can be regulated to have a proper value depending on a result of the estimation.

In the first embodiment, moreover, the control unit 30 calculates the bit error rate as well as the fluctuation range of the bit error rate when calculating the bit error rate of the reproduced information. Then, the control unit 30 determines the current to flow to the first heat absorbing element 16 and the second heat absorbing element 17 depending on both the bit error rate and the fluctuation range. For example, the control unit 30 determines to increase the magnitude of the current to flow to the first heat absorbing element 16 and the second heat absorbing element 17 so as to be greater than the magnitude determined immediately before when it is estimated that the amount of protrusion of the ABS surface 10a toward the magnetic recording medium 5 side tends to be increased based on both the bit error rate and the fluctuation range. Alternatively, the control unit 30 determines a non-increase in the magnitude of the current to flow to the first heat absorbing element 16 and the second heat absorbing element 17 as compared with the magnitude determined immediately before when it is not estimated that the amount of protrusion of the ABS surface 10a toward the magnetic recording medium 5 side tends to be increased based on at least one of the bit error rate and the fluctuation range, for example. Consequently, it is possible to enhance precision in the estimation of the state in which the amount of protrusion of the ABS surface 10a toward the magnetic recording medium 5 side tends to be increased. Therefore, it is possible to regulate the magnitude of the current to flow to the first heat absorbing element 16 and the second heat absorbing element 17 so as to have a proper value while suppressing a wasteful increase in the magnitude of the current to flow to the first heat absorbing element 16 and the second heat absorbing element 17.

If the first heat absorbing element 16 and the second heat absorbing element 17 are disposed adjacently to the near-field light generating unit 12 in the direction along the ABS surface 10a in the heat absorbing unit 40, the end face of each of the first heat absorbing element 16 and the second heat absorbing element 17 toward the magnetic recording medium 5 side may be disposed in a plane position which is retreated from the ABS surface 10a.

Alternatively, the heat absorbing unit 40 may have a structure in which one of the first heat absorbing element 16 and the second heat absorbing element 17 is omitted. In this case, either of the first insulating layer 41 and the second insulating layer 42 which corresponds to the omitted heat absorbing element may further be omitted.

Figure 10:
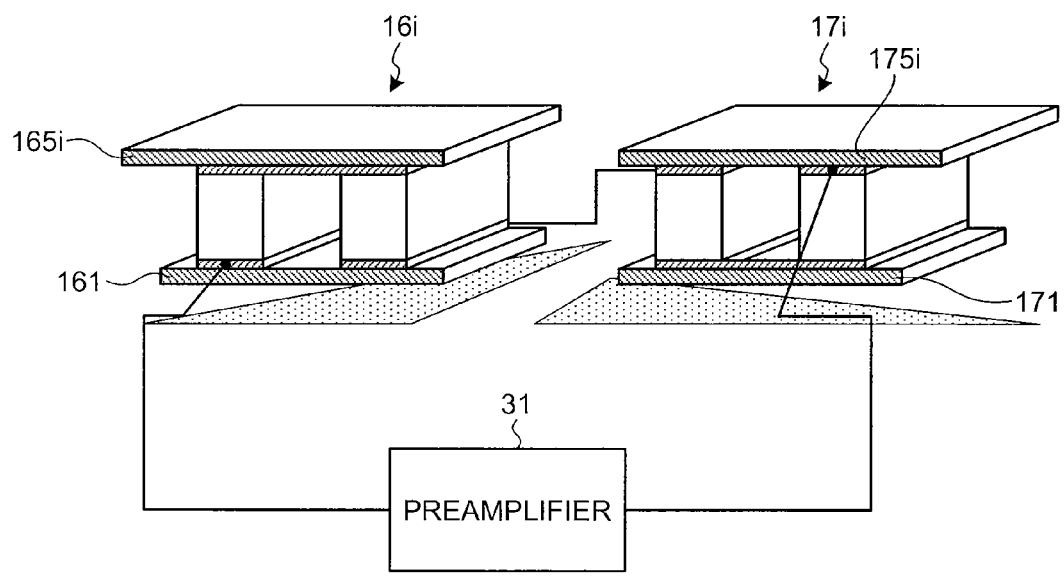
FIG. 10 is a view showing a structure of a heat absorbing unit according to a variant of the first embodiment.

Alternatively, a surface area of a first radiating layer 165i may be larger than that of the first heat absorbing layer 161 in a first heat absorbing element 16i as shown in FIG. 10. In a second heat absorbing element 17i, a surface area of a first radiating layer 175i may be larger than that of the first heat absorbing layer 171. In this case, the first heat absorbing element 16i and the first heat absorbing element 17i can easily ensure large areas of regions exposed to the ambient atmosphere in the first radiating layer 165i and the first radiating layer 175i, respectively. Therefore, it is possible to efficiently radiate the heat of the heat conducting unit 15 absorbing the heat into the ambient atmosphere.

Figure 11:
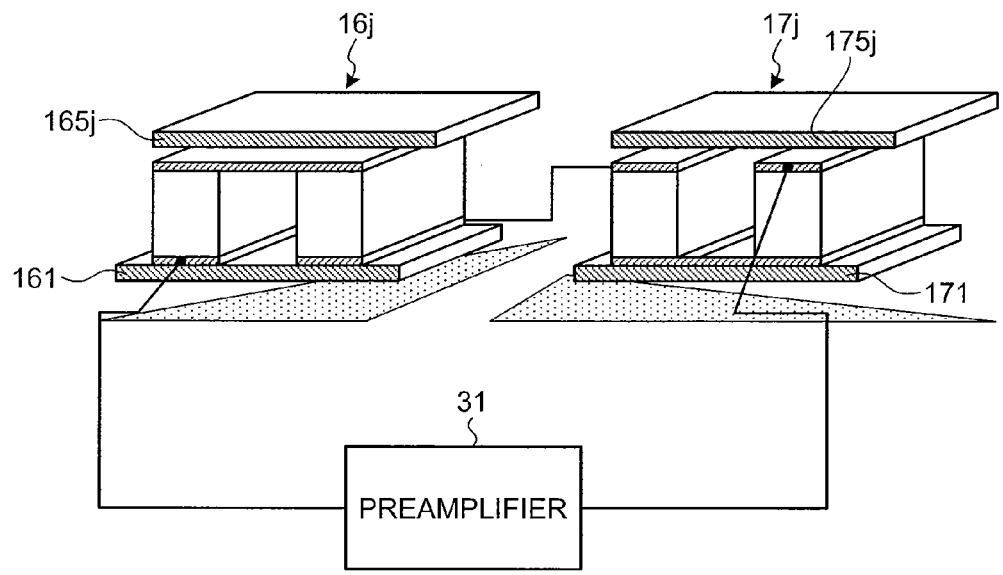
FIG. 11 is a view showing a structure of a heat absorbing unit according to another variant of the first embodiment.
Figure 12:
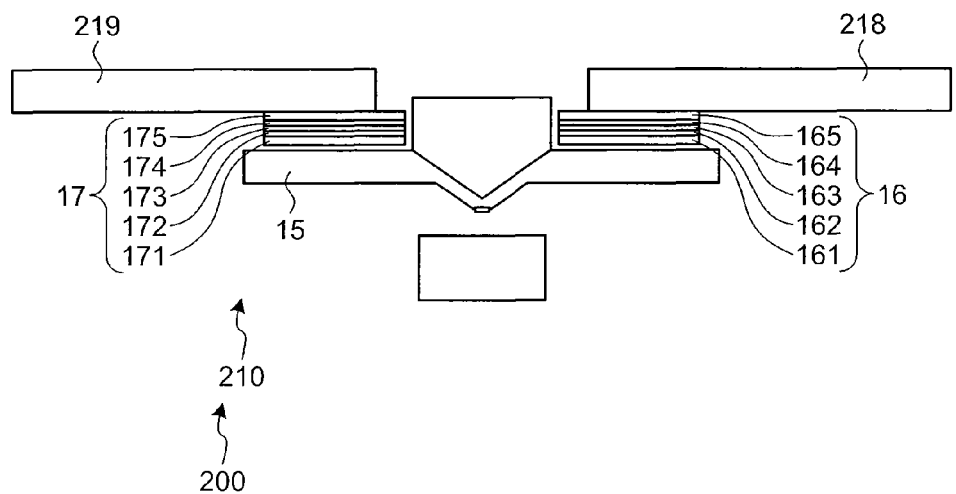
FIG. 12 is a view showing a structure of a magnetic recording head according to a second embodiment.

Alternatively, an end face of a first radiating layer 165j on the magnetic recording medium 5 side may be disposed in a plane position which is retreated from the ABS surface 10a in a first heat absorbing unit 16j as shown in FIG. 11. In the second heat absorbing element 17j, an end face of a second radiating layer 175j on the magnetic recording medium 5 side may be disposed in a plane position which is retreated from the ABS surface 10a. In this case, each of the first heat absorbing element 16i and the first heat absorbing element 17i can radiate the heat of the heat conducting unit 15 absorbing the heat in a position which is retreated more greatly from the ABS surface 10a. Therefore, it is possible to prevent the heat radiated into the ambient atmosphere from reaching the vicinity of the ABS surface 10a. Consequently, it is possible to further reduce the amount of protrusion of the ABS surface 10a of the magnetic recording head 10 toward the magnetic recording medium 5 side.

(Second Embodiment)

Next, a magnetic recording and reproducing device 200 according to a second embodiment will be described.

Different portions from the first embodiment will be mainly described below.

In the magnetic recording and reproducing device 200, a heat absorbing unit 240 of a magnetic recording head 210 further has a first radiating member 218 and a second radiating member 219.

The first radiating member 218 is thermally connected to a first radiating layer 165 of a first heat absorbing element 16 and radiates a heat of the first radiating layer 165. A second radiating member 219 is thermally connected to a second radiating layer 175 of a second heat absorbing element 17 and radiates a heat of the second radiating layer 175.

Figure 13:
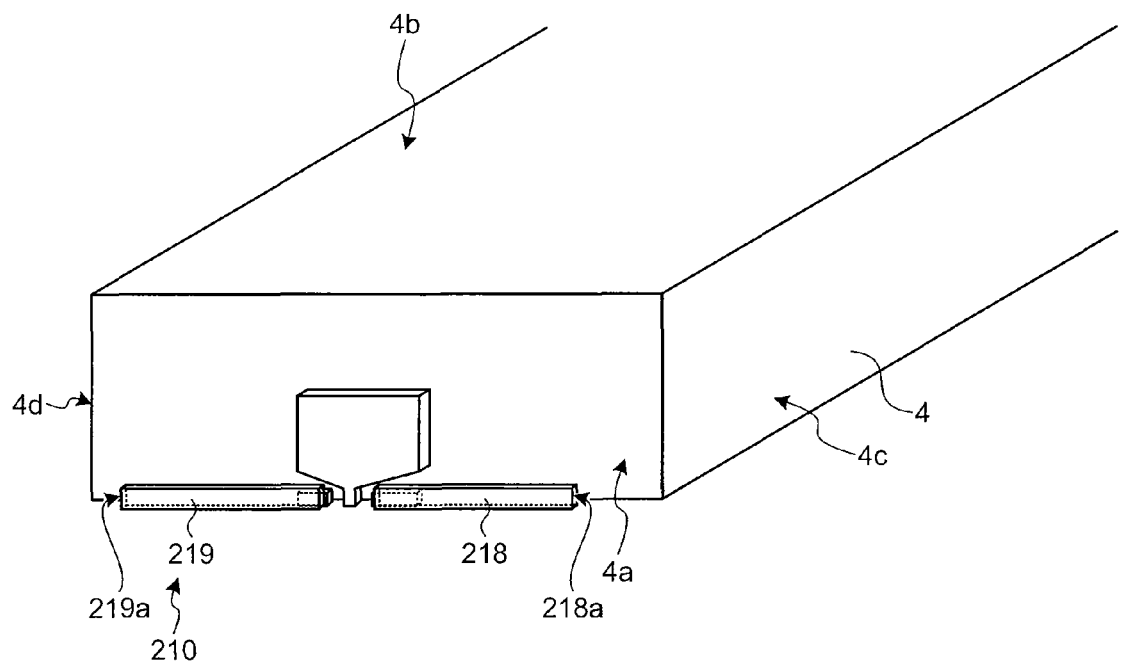
FIG. 13 is a view showing the structure of the magnetic recording head according to the second embodiment.

As shown in FIG. 13, moreover, each of the first radiating member 218 and the second radiating member 219 takes a corresponding shape to a trailing end 4a of a head slider 4. Each of the first radiating member 218 and the second radiating member 219 has at least one of ends extended to the vicinity of at least one of an upper end and both side ends in the head slider. More specifically, the first radiating member 218 is extended apart from the second heat absorbing member 17 toward the first heat absorbing member 16 side in a longitudinal direction (for example, a direction of a track width) of the trailing end 4a. The first radiating member 218 has an end 218a extended to the vicinity of a side end 4c of the head slider 4. The second radiating member 218 is extended apart from the first heat absorbing member 16 toward the second heat absorbing member 17 side in the longitudinal direction (for example, the direction of the track width) of the trailing end 4a. The second radiating member 219 has an end 219a extended to the vicinity of a side end 4d of the head slider 4.

In the second embodiment, thus, the heat absorbed by the first heat absorbing element 16 and the second heat absorbing element 17 can be radiated by the first radiating member 218 and the second radiating member 219 which have larger surface areas than the first radiating layer 165 and the second radiating layer 175. Therefore, the heat of a radiating unit 15 absorbing the heat can be radiated into an ambient atmosphere more efficiently.

In the second embodiment, moreover, the first radiating member 218 and the second radiating member 219 take corresponding shapes to the trailing end 4a, respectively. Therefore, the structure of the magnetic recording head 210 can be wholly compact.

In the second embodiment, furthermore, the first radiating member 218 and the second radiating member 219 take shapes extended in the longitudinal direction of the trailing end 4a, respectively. Consequently, it is possible to easily maintain the surface areas of the first radiating member 218 and the second radiating member 219 to be large while causing the structure of the magnetic recording head 210 to be wholly compact.

Figure 14:
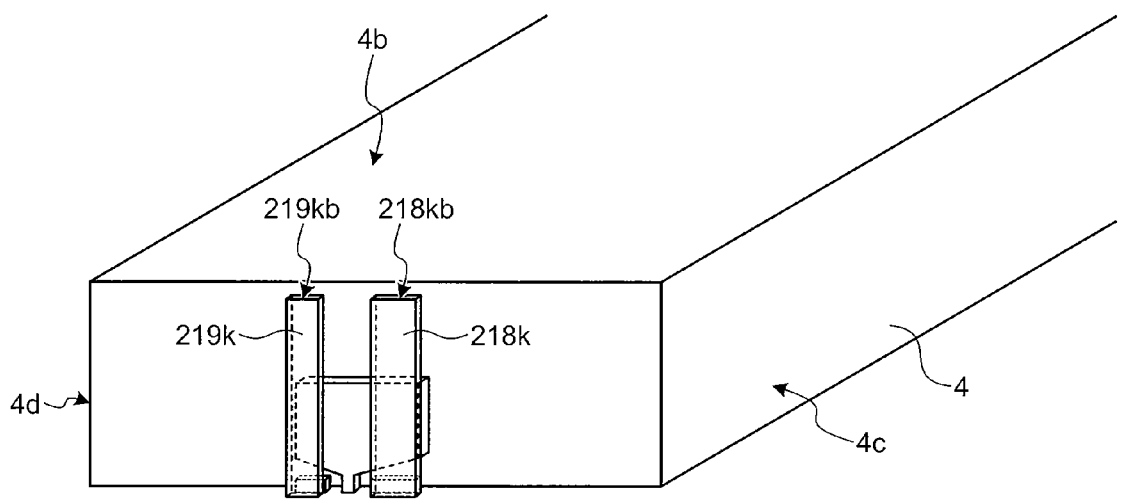
FIG. 14 is a view showing a structure of a magnetic recording head according to a variant of the second embodiment.

As shown in FIG. 14, a first radiating member 218k may take a shape extended in a shorter direction (for example, a height direction) of the trailing end 4a. A second radiating member 219k may take a shape extended in the shorter direction (for example, the height direction) of the trailing end 4a. In other words, the first radiating member 218k has an end 218kb extended to the vicinity of the upper end 4b of the head slider 4. The second radiating member 219k may have an end 219kb extended to the vicinity of the upper end 4b of the head slider 4. In this case, the heat of the radiating unit 15 absorbing the heat can be radiated in a position which is retreated more greatly from an ABS surface 10a. Therefore, it is possible to prevent the heat radiated into the ambient atmosphere from reaching the vicinity of the ABS surface 10a. Consequently, it is possible to further reduce the amount of protrusion of the ABS surface 10a of a magnetic recording head 10 toward a magnetic recording medium 5 side.

Figure 15:
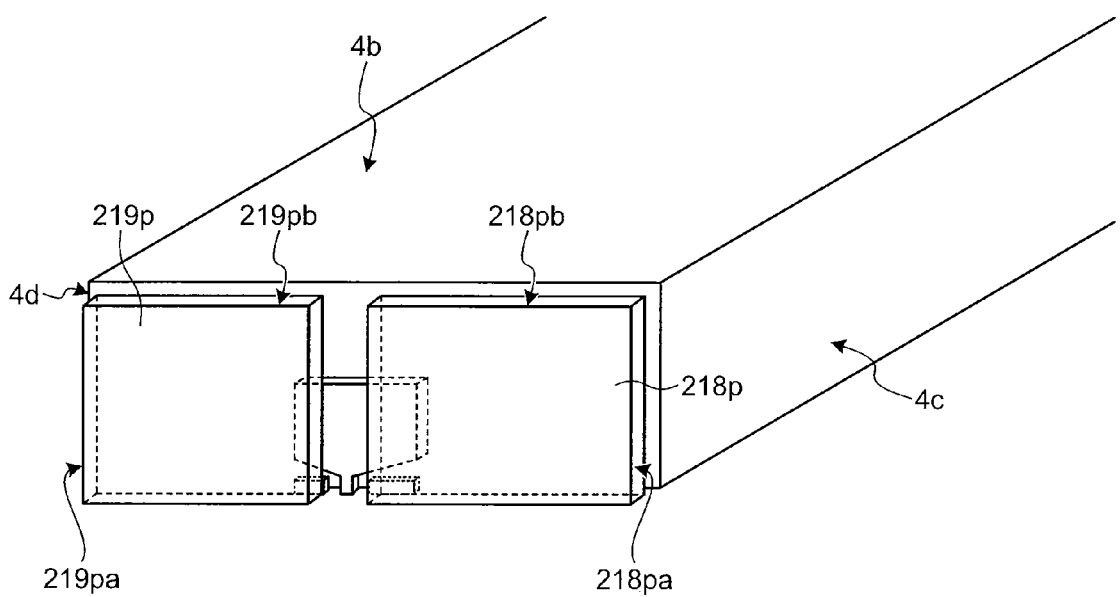
FIG. 15 is a view showing a structure of a magnetic recording head according to a variant of the second embodiment.

Alternatively, a first radiating member 218p may take a shape extended in a plane direction of the trailing end 4a as shown in FIG. 15. A second radiating member 219p may take a shape extended in the plane direction of the trailing end 4a. In other words, the first radiating member 218p may have an end 218pa extended to the vicinity of the side end 4c of the head slider 4 and may have an end 218 kb extended to the vicinity of the upper end 4b of the head slider 4. A second radiating member 219k has an end 219a extended to the vicinity of the side end 4d of the head slider 4 and has an end 219kb extended to the vicinity of the upper end 4b of the head slider 4. In this case, it is possible to easily maintain surface areas of the first radiating member 218p and the second radiating member 219p to be large while causing the structure of the magnetic recording head 210 to be wholly compact. Moreover, the heat of the radiating unit 15 absorbing the heat can be radiated in the position which is retreated more greatly from the ABS surface 10a. Therefore, it is possible to prevent the heat radiated into the ambient atmosphere from reaching the vicinity of the ABS surface 10a. Consequently, it is possible to further reduce the amount of protrusion of the ABS surface 10a of the magnetic recording head 10 toward the magnetic recording medium 5 side.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording head which records information on a magnetic recording medium, comprising:
    an air bearing surface facing the magnetic recording medium;
    a near-field light generating unit disposed on the ABS surface;
    a heat conducting unit that includes a heat conductor disposed in contact with the near-field light generating unit, is formed from a metal, and extends substantially perpendicular to a track of the magnetic recording medium; and
    a heat absorbing unit disposed in contact with the heat conducting unit and proximate to the near-field light generating unit, oriented substantially parallel to the ABS surface, and comprising a heat absorbing element and an electrically insulating layer formed by a thermal conductor disposed between the heat conducting unit and the heat absorbing element,
    wherein the heat absorbing element includes a Peltier element having a heat absorbing layer, an electrode layer, a semiconductor layer, a conductive layer, and a radiating layer that are sequentially stacked on a leading surface of the heat conducting unit, and wherein
    the heat absorbing layer is configured to absorb a thermal energy from the heat conducting unit; and
    the radiating layer is disposed on a surface of the Peltier element opposite to a surface of the Peltier element that is in contact with the heat conducting unit and configured to radiate the thermal energy absorbed by the heat absorbing layer.

2. The magnetic recording head according to claim 1, wherein the heat absorbing layer contacts the heat conducting unit, the electrode layer contacts the heat absorbing layer, the semiconductor layer contacts the electrode layer, the conductive layer contacts the semiconductor layer, and the radiating layer contacts the conductive layer.

3. The magnetic recording head according to claim 1, wherein the heat absorbing unit further includes a radiating member disposed in contact with the radiating layer.

4. The magnetic recording head according to claim 3, wherein the radiating member has at least one edge facing away from a head slider and an opposite edge in contact with the head slider.

5. A magnetic recording and reproducing device comprising:
 a magnetic recording medium;
 a magnetic recording head configured to record information on the magnetic recording medium; and
 a magnetic reproducing head configured to read the recorded information as a reproducing signal from the magnetic recording medium,
 the magnetic recording head including:
 an air bearing surface facing the magnetic recording medium;
 a near-field light generating unit disposed on the ABS surface;
 a heat conducting unit that includes a heat conductor disposed in contact with the near-field light generating unit, is formed from a metal, and extends substantially perpendicular to a track of the magnetic recording medium; and
 a heat absorbing unit disposed in contact with the heat conducting unit and proximate to the near-field light generating unit, oriented substantially parallel to the ABS surface, and comprising a heat absorbing element and an electrically insulating layer formed by a thermal conductor interposed between the heat conducting unit and the heat absorbing element,
 wherein the heat absorbing element includes a Peltier element having a heat absorbing layer, an electrode layer, a semiconductor layer, a conductive layer, and a radiating layer that are sequentially stacked on a leading surface of the heat conducting unit, and wherein
 the heat absorbing layer is configured to absorb a thermal energy from the heat conducting unit; and
 the radiating layer is disposed on a surface of the Peltier element opposite to a surface of the Peltier element that is in contact with the heat conducting unit and configured to radiate the thermal energy absorbed by the heat absorbing layer.

6. The magnetic recording and reproducing device according to claim 5, wherein the heat absorbing unit further includes a radiating member disposed in contact with the radiating layer.

7. The magnetic recording and reproducing device according to claim 6, wherein the radiating member has at least one edge facing away from a head slider and an opposite edge in contact with the head slider.

8. A magnetic recording and reproducing device comprising:
 a magnetic recording medium;
 a magnetic recording head configured to record information on the magnetic recording medium; and
 a magnetic reproducing head configured to read the recorded information as a reproducing signal from the magnetic recording medium,
 the magnetic recording head including:
 an air bearing surface facing the magnetic recording medium;
 a near-field light generating unit disposed on the ABS surface;
 a heat conducting unit that includes a heat conductor disposed in contact with the near-field light generating unit;
 a heat absorbing unit disposed in contact with the heat conducting unit and proximate to the near-field light generating and oriented substantially parallel to the ABS surface;
 a reproducing signal detecting unit configured to detect a reproducing signal from the magnetic reproducing head;
 a saving unit which saves a plurality of reproducing signals detected by the reproducing signal detecting unit;
 a calculating unit configured to compare the reproducing signals saved in the saving unit, thereby carrying out a calculation corresponding to a result of the comparison;
 a determining unit configured to determine a current to flow to the heat absorbing unit based on a result of the calculation obtained by the calculating unit; and
 a current supplying unit configured to cause the current to flow to the heat absorbing unit in accordance with a result of the determination obtained by the determining unit.

9. The magnetic recording and reproducing device according to claim 8, wherein the calculating unit calculates a bit error rate depending on a result of the comparison between the reproducing signals saved in the saving unit, and
 the determining unit determines a current to flow to the heat absorbing unit depending on a variation in the bit error rate calculated by the calculating unit.

10. The magnetic recording and reproducing device according to claim 8, wherein the heat conducting unit is formed from a metal, and
 the heat absorbing unit has:
 a heat absorbing element; and
 an electrically insulating layer formed by a thermal conductor disposed between the heat conducting unit and the heat absorbing element.

11. The magnetic recording and reproducing device according to claim 10, wherein the heat absorbing element has:
 a heat absorbing layer configured to absorb a thermal energy from the heat conducting unit; and
 a radiating layer disposed on a surface of the Peltier element opposite to a surface of the Peltier element that is in contact with the heat conducting unit and configured to radiate the thermal energy absorbed by the heat absorbing layer.

12. The magnetic recording and reproducing device according to claim 11, wherein the heat absorbing element includes a Peltier element.

13. The magnetic recording and reproducing device according to claim 11, wherein the heat absorbing unit further includes a radiating member disposed in contact with the radiating layer.

14. The magnetic recording and reproducing device according to claim 13, wherein the radiating member has at least one edge facing away from a head slider and an opposite edge in contact with the head slider.

* * * * *